(12) United States Patent
Majerik

(10) Patent No.: US 8,272,652 B2
(45) Date of Patent: Sep. 25, 2012

(54) SUSPENSION FOR VEHICLE

(76) Inventor: Frank Majerik, Empire, AL (US)

( * ) Notice: Subject to any disclaimer, the term of this patent is extended or adjusted under 35 U.S.C. 154(b) by 147 days.

(21) Appl. No.: 12/979,022

(22) Filed: Dec. 27, 2010

(65) Prior Publication Data

US 2012/0161412 A1    Jun. 28, 2012

(51) Int. Cl.
*B60G 9/02* (2006.01)
*B60G 21/055* (2006.01)
*B60G 3/12* (2006.01)

(52) U.S. Cl. ... 280/124.116; 280/124.128; 280/124.153; 280/124.152

(58) Field of Classification Search .......... 280/124.106, 280/124.107, 124.11, 124.116, 124.128, 280/124.153, 124.152, 124.145, 124.148, 280/124.149, 124.13
See application file for complete search history.

(56) References Cited

U.S. PATENT DOCUMENTS

| 4,518,171 A * | 5/1985 | Hedenberg | 280/6.159 |
|---|---|---|---|
| 5,427,404 A * | 6/1995 | Stephens | 280/124.162 |
| 6,158,750 A * | 12/2000 | Gideon et al. | 280/86.5 |
| 6,267,397 B1 * | 7/2001 | Hamada et al. | 280/124.128 |
| 6,328,322 B1 * | 12/2001 | Pierce | 280/124.131 |
| 6,390,485 B1 * | 5/2002 | Cadden | 280/124.163 |
| 6,428,027 B1 * | 8/2002 | Stuart | 280/124.157 |
| 6,626,454 B1 * | 9/2003 | Power et al. | 280/683 |
| 6,851,689 B2 * | 2/2005 | Dudding et al. | 280/124.128 |
| 6,945,548 B2 * | 9/2005 | Dudding et al. | 280/124.157 |
| 7,475,892 B2 * | 1/2009 | Dudding et al. | 280/124.11 |
| 7,722,064 B2 * | 5/2010 | Stuart et al. | 280/124.128 |
| 7,997,598 B2 * | 8/2011 | Ralph et al. | 280/124.116 |
| 2005/0146110 A1 * | 7/2005 | Dudding | 280/124.128 |
| 2006/0255557 A1 * | 11/2006 | Hass et al. | 280/124.116 |
| 2008/0290623 A1 * | 11/2008 | Lundmark | 280/124.152 |

\* cited by examiner

*Primary Examiner* — Drew Brown
(74) *Attorney, Agent, or Firm* — Baker Donelson Bearman Caldwell & Berkowitz, PC

(57) ABSTRACT

A suspension for a rear or a front portion of a chassis for vehicles in which a pair of longitudinal stabilizer assemblies and an anti-sway stabilizer each use a same type of a stabilizer bar, with the longitudinal stabilizer assemblies pivotably connected on opposing sides of the chassis and the anti-sway stabilizer pivotably connected in transverse relation proximate an end of the chassis. The longitudinal stabilizer assemblies and the anti-sway stabilizer each include a portion of a saddle that extends around the axle and rigidly connects to the axle. A shock absorber connects between the saddle and the chassis.

22 Claims, 6 Drawing Sheets

SUSPENSION FOR VEHICLE

TECHNICAL FIELD

The present invention relates to chassis suspension apparatus for motor vehicles. More particularly, the present invention is directed to chassis suspensions for personnel, tool and equipment, and materials transport vehicles generally having low occupancy and travel at low speeds.

BACKGROUND OF THE INVENTION

Labor-intensive industries, such as mining, manufacturing, landscaping, and the like, often transport personnel, equipment, and materials between locations at work facilities. Manufacturing and warehouse facilities, as well as other businesses, use forklift trucks for lifting and moving pallets of products and materials, often to and from loading docks, storage racks, and point-of-use of the products and materials. Mining, in particular, faces transport problems that involve not only movement of personnel but movement of tools and equipment, and excavated waste materials and ore. Mines often have long corridors or passageways leading from mine entrances to the mining face for ore extraction. Other passageways link the various mining chambers. The passageways are opened by drilling and excavation. The surface of the passageway on which persons walk or are transported typically are rough, similar to an above-ground gravel road scraped in the surface of the ground. The passageways are not paved for smooth movement of persons and transport vehicles.

Movement of transit vehicles along the passageways is slow. Many mines have speed limits for safety purposes as the vehicles travel through the dimly-lit passageways. In addition, the rough surface of the passageway limits transport speeds. However, transport vehicles for use in mines are constructed for functional purposes and not the comfort of the operator and personnel traveling on the vehicles. The vehicles typically have a chassis formed of box beams. Axles attach rigidly to the chassis. As a consequence, jolts and bumps experienced by the vehicle moving on the rough and uneven floor surface of the passageway communicate directly through the chassis to the occupants operating the vehicle or being transported by the vehicle. While reduced speed lessens the jostling and pounding experienced by the vehicle occupants, reduced speed is not entirely satisfactory. For single-occupant vehicles, such as a load hauler or equipment carrier, air-dampened suspension seats are typically installed in the vehicle. The suspension seats dampen and cushion the rough ride. Nevertheless, the vehicle operator still experiences significant jostling and bumping as the vehicle moves through the passageways.

Accordingly, there is a need in the art for an improved suspension system for low occupancy, low speed vehicles. It is to such that the present invention is directed.

SUMMARY OF THE INVENTION

The present invention meets the need in the art for an improved suspension attached to a rear or front portion of the chassis for vehicles, comprising a pair of stabilizer assemblies for disposing longitudinally on opposing sides of a chassis of a vehicle and attaching to an axle thereof and an anti-sway stabilizer for disposing in transverse relation proximate an end of the chassis and attaching to the axle. Each stabilizer assembly uses a pair of stabilizer bars disposed in spaced-apart relation and the anti-sway stabilizer uses a third stabilizer bar. Each of the stabilizer assemblies further comprises a frame connector for welding to the chassis and pivotably connected to a respective end of the pair of stabilizer bars; an axle connector pivotably connected to a respective opposing end of the pair of stabilizer bars and having a first portion of a saddle that extends about the axle, the first portion defining a passageway for receiving a bolt therethrough for connecting the stabilizer bars to the axle; and a shock absorbing member for being attached at a first end to the axle connector and at an opposing end to the chassis. The anti-sway stabilizer further comprises a transverse connector pivotably connected to one end of the third stabilizer bar and having a second portion of the saddle, which second portion defines a passageway that aligns with the passageway in one of the first portions of the saddle for receiving the bolt therethrough for connecting the first and second portions of the saddle about the axle. A bracket is provided for being rigidly attached at first end to the chassis and pivotably connected to an opposing end of the third stabilizer bar.

Objects, advantages, and features of the present invention will become readily apparent upon reading of the following detailed description in reference to the drawings and the appended claims.

DETAILED DESCRIPTION

Figure 1:
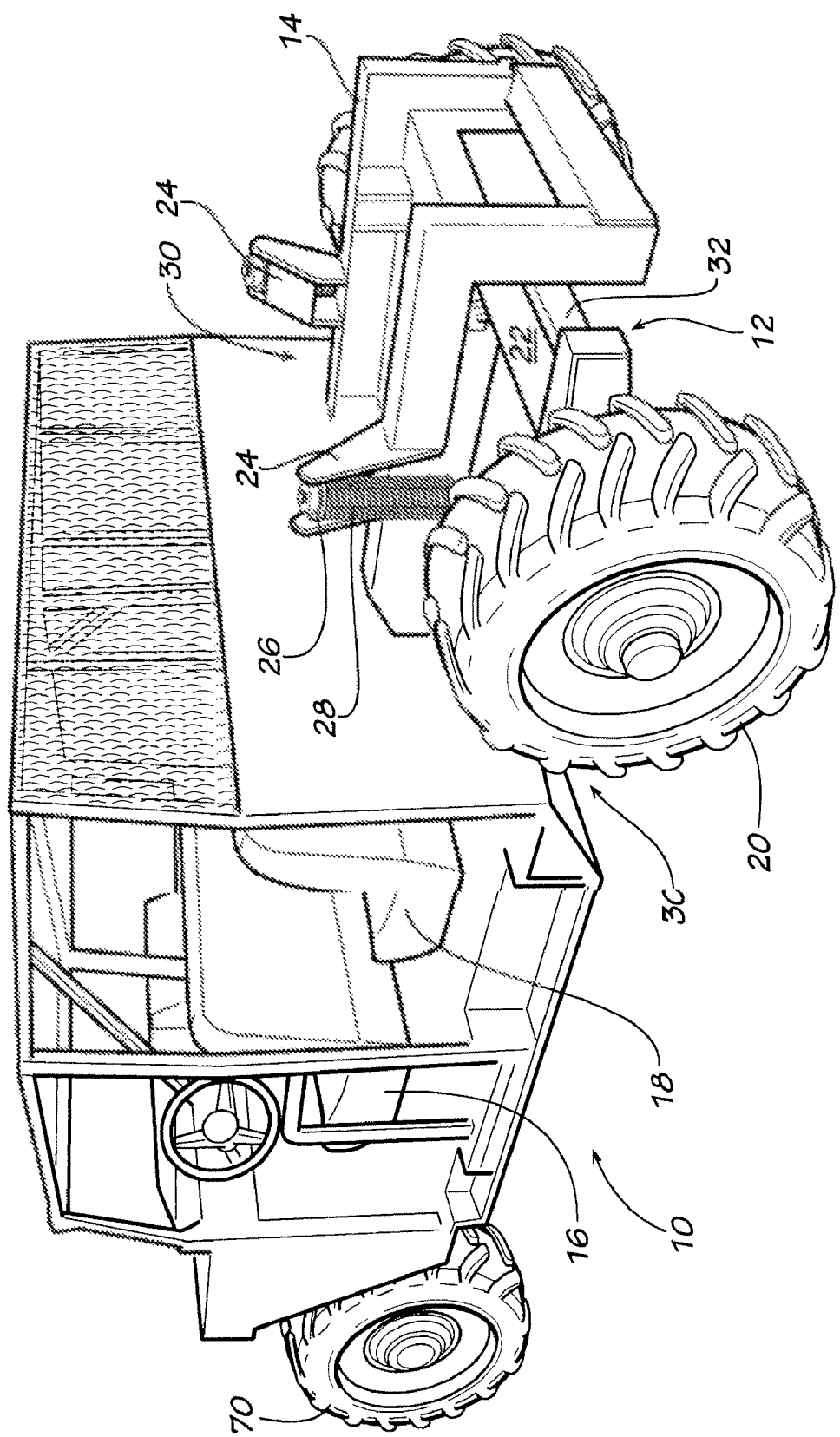
FIG. 1 illustrates in perspective view a motor vehicle configured with a suspension in accordance with the present invention.

With reference to the drawings, in which like reference numbers identify like parts, FIG. 1 illustrates in perspective view a motor vehicle 10 configured with a suspension generally 12 that attaches to a chassis 14 in accordance with the present invention. One suspension 12 attaches at a front portion of the chassis (suspension 12 not illustrated at the front portion in FIG. 1) and another suspension attaches at a rear portion of the chassis (suspension 12 partially illustrated in FIG. 1 at the rear portion). As discussed below, each suspension 12 includes two opposing longitudinal stabilizers generally 30 and one transverse stabilizer 32, as discussed below.

FIG. 1 illustrates the motor vehicle 10 configured for transport of personnel with front seating 16 for a driver and front passengers and back seating 18 for additional passengers. Although not illustrated, the motor vehicle 10 includes conventional motor vehicle components including an engine that couples to a drive mechanism for causing wheels 20 to rotate, which wheels attach to axles generally 22, and brakes for slowing or stopping the motor vehicle. In FIG. 1, a rear portion of the chassis 14 is open but readily configurable with a bin for holding and transporting materials, supplies, tools, and the like.

The suspension 12 includes a pair of opposing towers 24. Each tower 24 rigidly connects to opposing members of the chassis 14. The towers 24 connect to upper ends of shock absorbers 26. Each shock absorber 26 is part of an assembly that includes a conventionally mounted coil spring 28. The shock absorber 26 connects to one of the longitudinally disposed stabilizer assemblies 38 of the suspension 12, as discussed below. The suspension 12 further includes the lateral anti-sway stabilizer 32 disposed in an end portion of the chassis 14.

Figure 2:
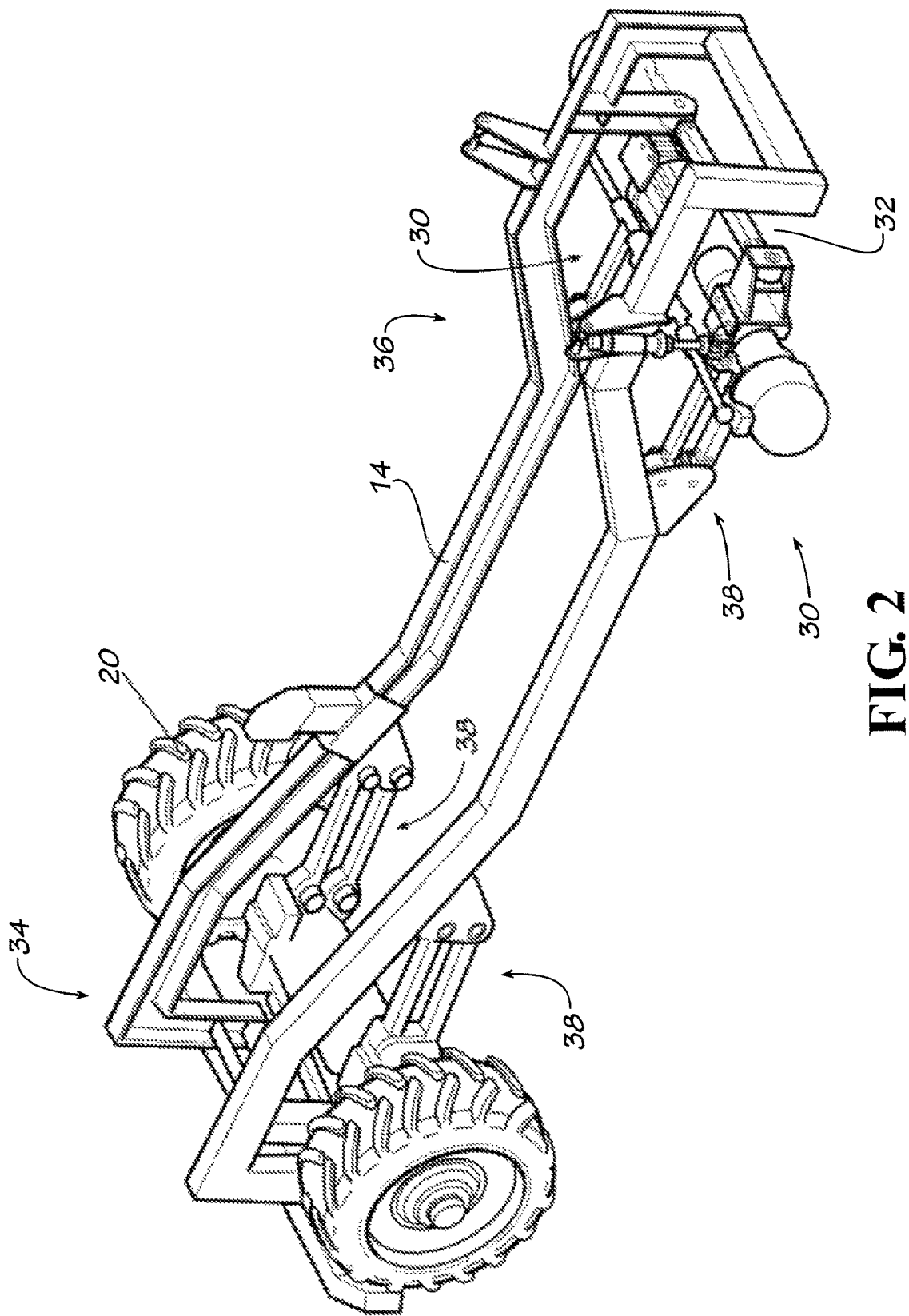
FIG. 2 illustrates in perspective view a chassis for the motor vehicle shown in FIG. 1 configured with a suspension in accordance with the present invention.

FIG. 2 illustrates in perspective view the chassis 14 for the motor vehicle 10 shown in FIG. 1. The chassis 14 uses one suspension 12 attached in a front portion generally 34 and one suspension 12 attached in a rear portion generally 36. The chassis 14 assembles with a plurality of elongated U-shaped box beam members extending longitudinally on opposing lateral sides of the motor vehicle 10. Such beams are illustrative and other beams may be used to assemble the structure of the frame 14.

Figure 3:
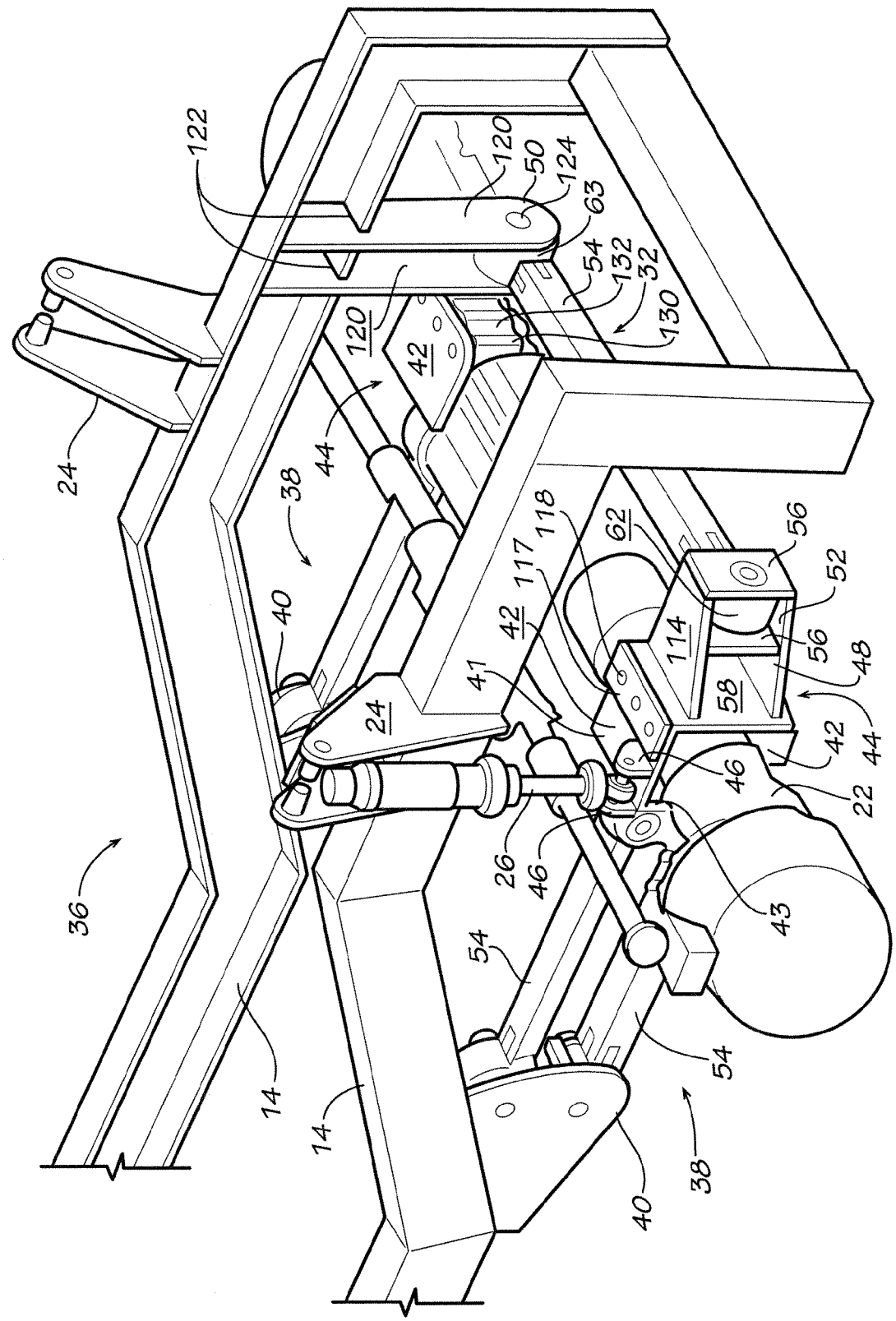
FIG. 3 illustrates in perspective detailed view a rear portion of the chassis shown in FIG. 2.

With reference to first to the rear portion 36 and also to FIG. 3 showing the rear portion in detail, the suspension 12 includes a pair of the stabilizer assemblies 38 that are disposed longitudinally on opposing sides of the chassis 14. A frame connector 40 attaches one end of the stabilizer assembly 38 to the chassis 14. An opposing end of the stabilizer assembly 38 pivotably attaches to a saddle connector 41. The saddle connector 41 includes a pair of opposing plates 42 and a joining plate 43 as a first portion of a saddle 44. The saddle 44 extends around the axle 22 to secure the suspension 12 to the axle. The shock absorber 26 connects at a lower end to ears 46 mounted to one of the plates 42. An upper end of the shock absorber 26 connects to the tower 24. The shock absorber 26 thereby connects one end of the stabilizer assembly 38 to the chassis 14 through the saddle 44.

The anti-sway stabilizer 32 attaches in the chassis 14 proximate an end portion of the chassis. The anti-sway stabilizer 32 connects at one end to the saddle 44 with a transverse connector 48 and at the opposing end to a chassis support 50. The transverse connector 48 includes a connector 52. One end of a stabilizer bar 54 pivotably attaches to the connector 52. The connector 52 includes a pair of plates 56 and a joining plate 58 The transverse connector 48 also includes a second portion of the saddle 44 (discussed below). As noted above, the saddle 44 extends around and rigidly connects the suspension 12 to the axle 22.

The forward end 34 of the chassis 14 likewise includes two of the longitudinally disposed stabilizers 30 and one anti-sway stabilizer 32.

Figure 4:
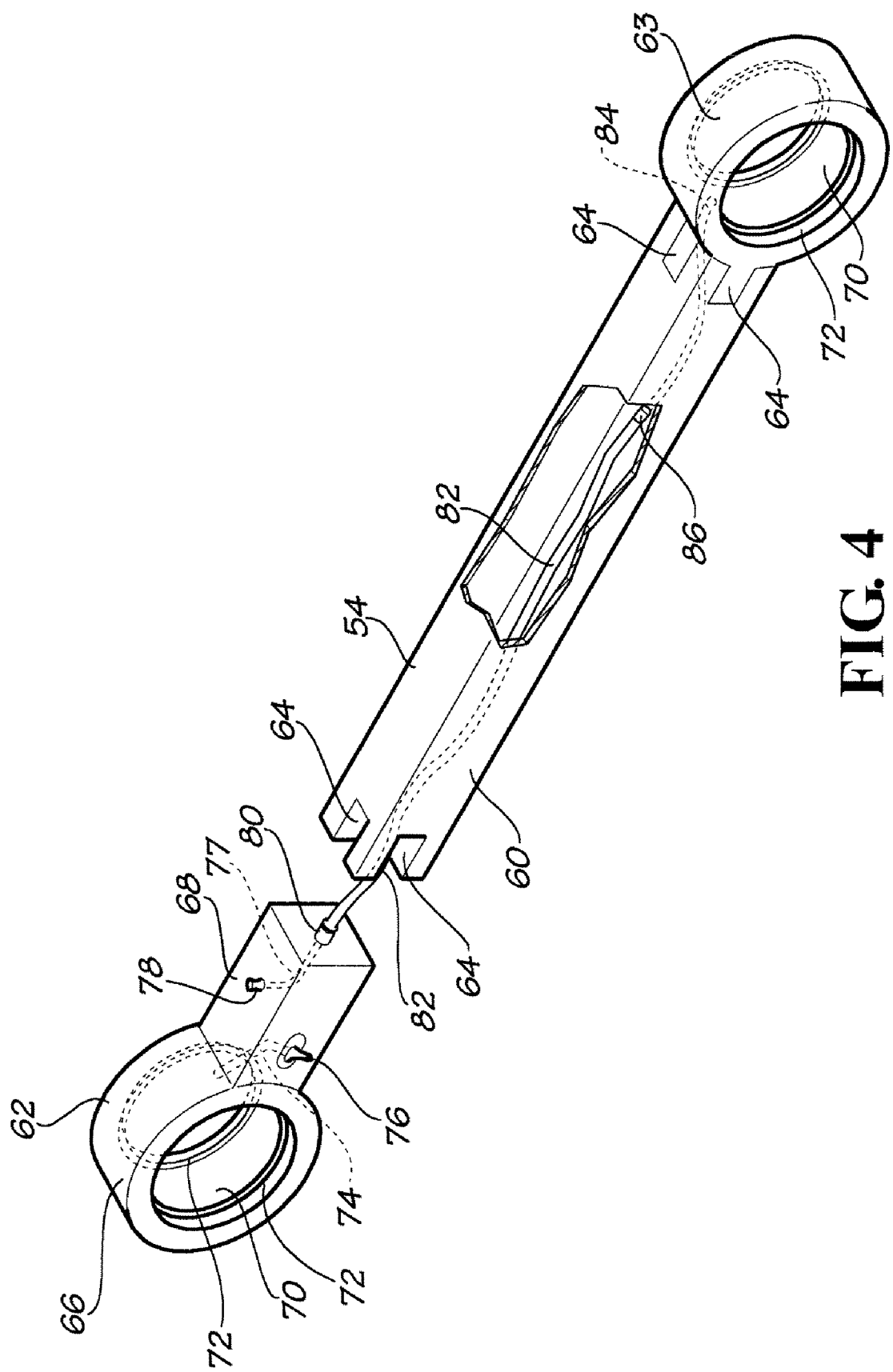
FIG. 4 illustrates in perspective cut-away view a stabilizer bar used in the suspension illustrated in FIG. 2, with a bearing block exploded from one end of the stabilizer bar.

As shown in FIG. 3, each stabilizer assembly 38 uses two of the stabilizer bars 54 while the anti-sway stabilizer 32 uses one of the stabilizer bars 54. FIG. 4 illustrates a perspective cut-away view of the stabilizer bar 54. The stabilizer bar 54 includes a square tubing box beam 60 and opposing bearing blocks 62, 63. The bearing block 62 is illustrated exploded from the box beam 60. The box beam 60 includes slots 64 open at respective ends of the beam and extending longitudinally towards the opposing end. In the illustrated embodiment, one slot 64 is defined in each face of the square tube box beam 60.

The bearing blocks 62, 63 each include a bearing housing 66 and a bearing insert 68. The bearing housing 66 defines an annular cavity 70 with opposed recessed retainer ring grooves 72. A self-aligning radial ball-bearing chase mounts in the cavity 70 and is held in place by retainer rings received in the grooves 72. The bearing insert 68 is sized for being insertingly received within a respective open end of the box beam 60.

Figure 5:
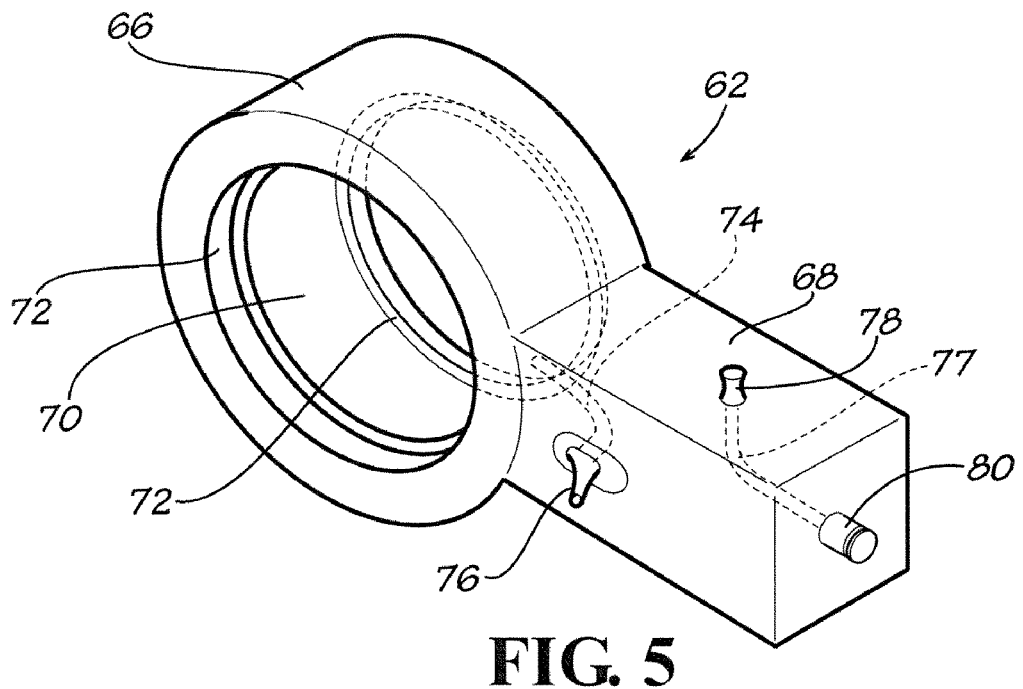
FIG. 5 illustrates a detailed plan view of the bearing holder.

With reference to FIG. 5, the bearing block 62 includes a first grease passageway 74 machined to be open to the cavity 70. A grease fitting 76 attaches in a seat defined at a leading end of the passageway 74, for connecting to a grease supply in order to communicate grease to the bearing chase in the cavity 70 of the bearing block 62. The bearing block 62 includes a second grease passageway 77 in the bearing insert 68. A grease fitting 78 attaches to the leading end of the second grease passageway 77 for connecting to external grease supply line. A grease fitting 80 attaches to the trailing end of the passageway 76. The grease fitting 80 connects to a flexible grease line 82 that is disposed within the box beam 60 during assembly.

As shown in FIG. 4, the bearing block 63 similarly defines a grease passageway 84 that opens to the cavity 70. A grease fitting 86 attaches to the passageway 84 and couples to an opposing end of the grease line 82.

It is to be appreciated that the grease line 82 is sufficiently long to connect during assembly first to the grease fitting 86 on the bearing block 63. The box beam 60 then receives the bearing insert 68 of the bearing block 63. The slots 64 receives welds to rigidly connect the bearing block 63 to the box beam 60. The grease line 82 extends outwardly of the opposing end of the box beam 60. The grease line 82 connects to the grease fitting 80 on the bearing insert 68 of the bearing block 62. The box beam 60 slidingly receives the bearing insert 68 of the bearing block 62. Once the bearing block 62 fully seats, the slots 64 receive welds that rigidly connect the bearing block 62 to the box beam 60. The grease fitting 78 attaches to the seat in the bearing block 62.

Figure 6:
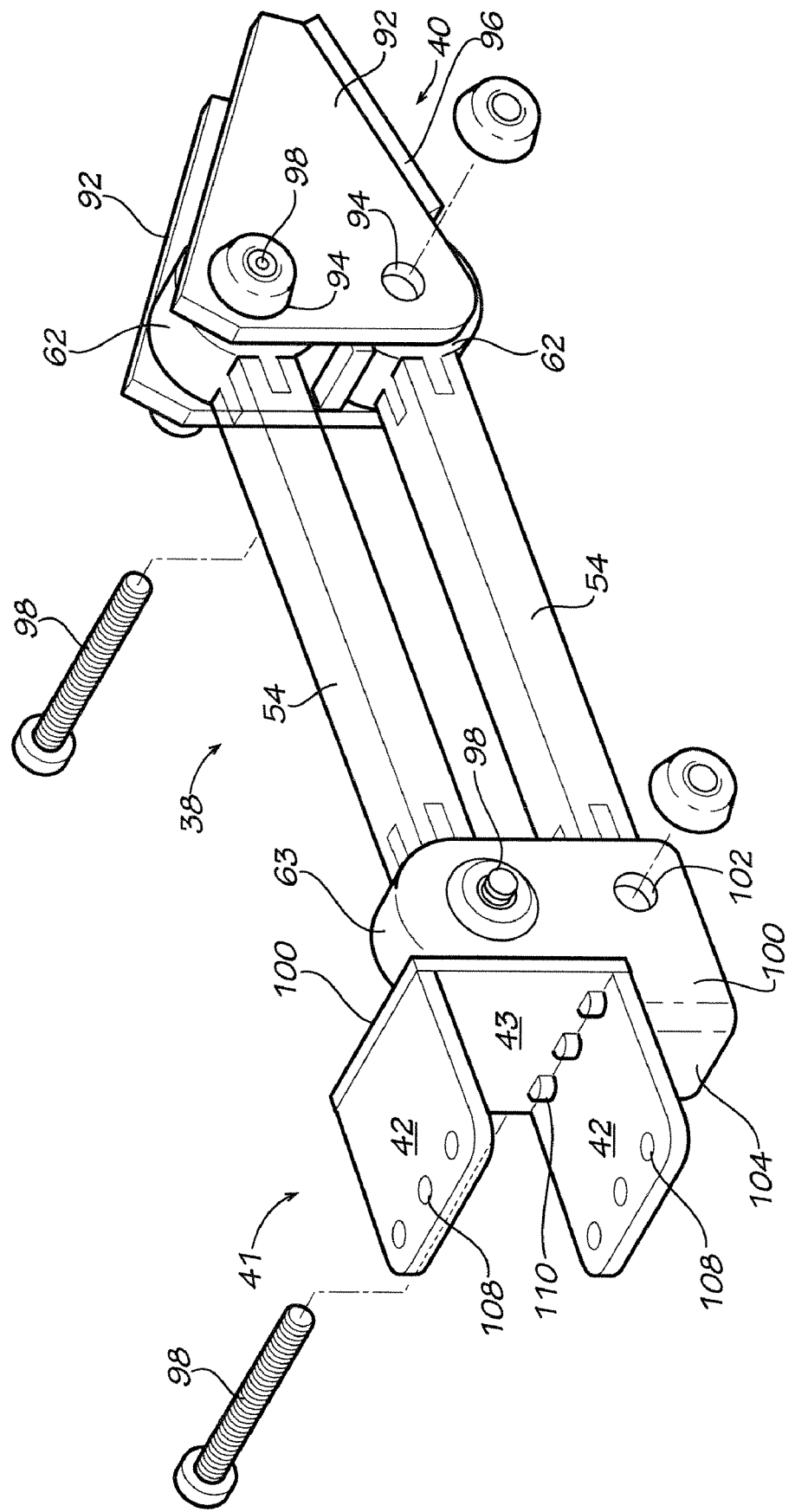
FIG. 6 illustrates a perspective view of a stabilizer assembly used in the suspension shown in FIG. 2.

FIG. 6 illustrates in perspective view the stabilizer assembly 38 used in the longitudinal stabilizer 30 shown in FIG. 2. The stabilizer assembly 38 includes two of the stabilizer bars 54 disposed in spaced-part relation. The stabilizer bars 54 pivotably connect to the frame connector 40 and to the saddle connector 41. The frame connector 40 comprises a pair of plates 92 that each defines two through-bores or openings 94. A gusset plate 96 connects between the spaced-part plates 92. The bearing block 62 in each of the stabilizer bars 54 is received between the plates 92 with the opening to the cavity 70 aligned with the respective openings 94. A pin or bolt 98 extends through the aligned openings 94 and cavity 70 of each of the stabilizer bars 54. A nut threadingly attaches to the bolt to secure the stabilizer bar 54 to the frame connector 40.

The bearing blocks 63 in the opposing ends of the stabilizer assembly 38 similarly mount between a pair of opposing plates 100 in the saddle connector 41. The plates 100 each define two through-bores or openings 102. The plates 100 include an extended seat 104. The joining plate 43 connects as a gusset between the plates 100. The pair of plates 42 connect to the plates 100 in spaced-apart relation and extend as cantilevers longitudinally from the joining plate 43. One plate 42 contacts and attaches by welding to the seat 104. Each plate 42 defines at least one through-bore or opening 108 in a free distal edge portion (three spaced-apart opening 108 are shown in the illustrated embodiment). The plates 42 and 43 define the first portion of the saddle 44 that extends around the axle 22 for connecting the stabilizer assembly 38 to the axle 22 as discussed below. At least one lug 110 attaches on interior surfaces of the opposing plates 42 adjacent the gusset plate 43 for a purpose discussed below. The illustrated embodiment uses three of the lugs 110 that are formed of half-round bars welded in place on interior sides of each plate 42. Bolts 98 extend through the aligned openings 102 and cavity 70 of each of the stabilizer bars 54. A nut threadingly attaches to the bolt to secure the stabilizer bar 54 to the saddle connector 41.

Figure 7:
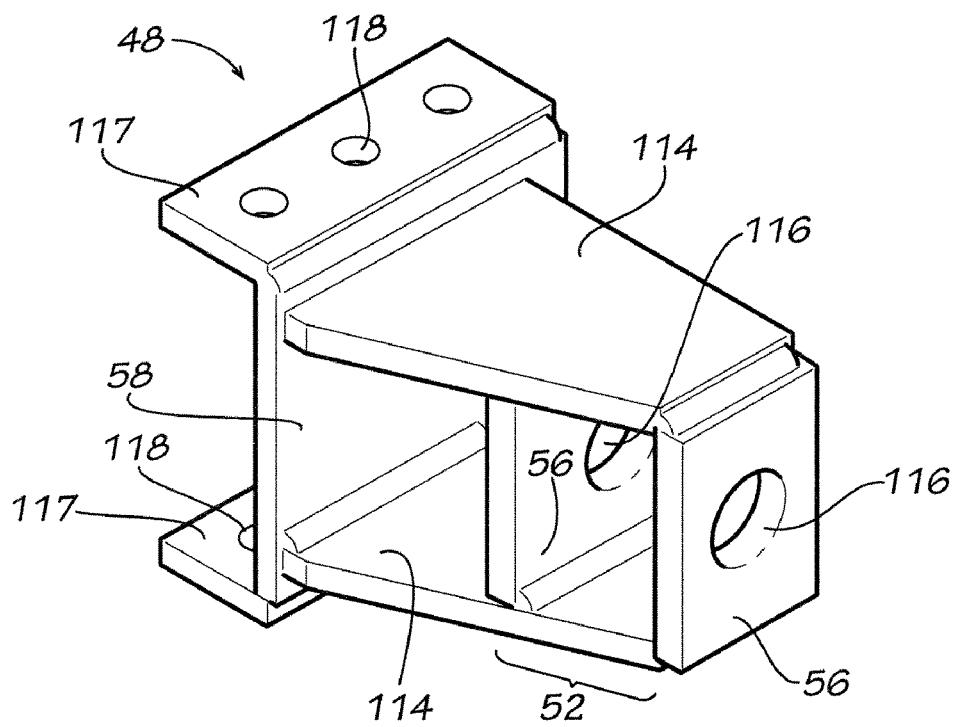
FIG. 7 illustrates a perspective view of a bracket used to connect the stabilizer bar to the chassis in the anti-sway stabilizer shown in FIG. 2.

FIG. 7 illustrates the transverse connector 48 in perspective view. The transverse connector 48 connects the anti-sway stabilizer 32 to the chassis 14, as shown in FIG. 2. The transverse connector 48 includes the connector 52 with the spaced-apart plates 56 for pivotably attaching the bearing block 62 of the stabilizer bar 54. The plates 56 attach to opposed support plates 114. The plates 56 define aligned through-bores or openings 116 and are spaced-apart for receiving the bearing block 62 so that the cavity 70 aligns with the openings 116. A bolt 98 extends through the aligned openings 116 and the cavity 70 of bearing block 62. A nut threadingly attaches to the bolt to secure the stabilizer bar 54 to transverse connector 48.

The transverse connector 48 also includes the second portion of the saddle 44. The joining plate 58 attaches to the support plates 114. A pair of plates 117 attach and extend laterally from the plate 58 in spaced-apart relation. The plates 117 define at least one opening 118 (three are illustrated). The plates 117 and 58 extend around the axle 22. The plates 117 contact the plates 42 of the first portion of the saddle 44. The openings 118 align with the openings 108 in the plates 42. Bolts (not illustrated) extend through the aligned openings 118, 108. Nuts threadably engage the bolts to rigidly connect the saddle 44 to the axle 22.

With reference to FIG. 3, an opposing end of the anti-sway stabilizer 32 pivotably attaches to chassis support 50. The chassis support 50 in the illustrated embodiment comprises a pair of spaced-apart plates 120 rigidly attached in space-apart relation to the U-channel box member on the chassis 14. The plates 120 define slots 122 for receiving a wall of the U-channel enabling the plates to sit flush with a web or bottom plate of the U-channel member. The plates 120 weld to the channels that form the chassis 14. Each of the plates 120 defines an opening 124 in an opposing end portion. The bearing block 63 of the stabilizer bar 54 aligns with the openings 124. A bolt 98 extends through the aligned openings 124 and the cavity 70 to pivotably connect the stabilizer bar 54 to the chassis support 50. A nut secures the bolt to the plates 120.

With reference to FIG. 4, the stabilizer bars 54 assemble by inserting the bearing blocks 62, 63 into the opposing open ends of the box beam 60. The grease line 82 connects during assembly first to the grease fitting 86 on the bearing block 63. The box beam 60 receives the bearing insert 68 of the bearing block 63. Welds in the slots 64 rigidly connect the bearing block 63 to the box beam 60. The grease line 82 extends outwardly of the open opposing end of the box beam 60. The grease line 82 connects to the fitting 80 on the bearing insert of the bearing block 62. The box beam 60 slidingly receives the bearing insert 68 of the bearing block 62. Once fully seated, welds in the slots 64 rigidly connect the bearing block 62 to the box beam 60. The grease fitting 78 attaches to the seat in the bearing block 62.

With reference to FIG. 6, the stabilizer assembly 38 connects two of the stabilizer bars 54 in spaced relation. Opposing ends of the stabilizer bars 54 include the bearing blocks 62, 63. The plates 92 sandwich the bearing blocks 62 and connect with the bolt 98 secured by the nut. The plates 100 sandwich the bearing blocks 63 in the opposing end of the stabilizer bars 54. The bolts 98 extend through the aligned openings 102 and cavity 70 and secure with nuts.

With reference to FIGS. 2 and 3, two stabilizer assemblies 38 attach in opposing relation to the chassis 14. The frame connector 40 welds to the chassis and the stabilizer bars 54 extend towards the axle 22 to position the opposing plates 42 and the joining plate 43 about a portion of the axle to define a portion of the saddle 44. In the illustrated embodiment, the axle 22 defines a plurality of ridges 130 and channels 132 on opposing rearward and forward sides. The lugs 110 are received in the channels of the axle 22 and bear against the sides of the ridges. Axles with such ridges and channels are available from Dana Italia S.P.A, Via Linfano, 15, 38062 Arco Trento, Italy.

The shock absorber 26 connects to the ears 46 and the tower 24. The anti-sway stabilizer 32 is then installed. The transverse connector 48 is positioned to align the openings 118 in the plates 117 with the openings 108 in the plates 42. As noted above, the plates 117 and 58 define the second portion of the saddle 44 about the axle 22. Bolts extend through the aligned openings 118, 108 in the plates 117, 42 on the upper and lower vertically spaced sides of the axle 22 and secure tightly with nuts. In the illustrated embodiment, the bolts are received in the channels 132 of the axle. Tightening the nuts and blots rigidly connects the assembled saddle 44 to the axle 22 and thus connects the suspension 12 to the axle. The lugs 110 are thereby snugged tightly in the channels 130 on the opposing side of the axle.

The opposing end of the anti-sway stabilizer 32 pivotably connects to the opposing side of the chassis 14. The bearing block 63 in the opposing end of the stabilizer bar 54 seats between the opposing plates 120 of the chassis support 50. The bolt extends through the aligned openings 124 and cavity 70 and secures with a nut.

During use of the motor vehicle 10 for transport, the shock absorbers 26 cushion shocks and vertical changes in the position of the wheel as the motor vehicle travels across the rough roadway on the floor of the mine cavern, or other roadway on which the motor vehicle 10 operates. The longitudinal stabilizers 38 pivot on the bearing blocks 62, 63 on the respective opposing ends during movement of the motor vehicle. The axles 22 are held in longitudinal position by the stabilizers 38. The anti-sway stabilizer 32 similarly pivots on opposing ends to dampen shocks as the motor vehicle moves.

The dusty and dirty operating conditions of the mine necessitate frequent re-greasing of the bearing chase held in the cavities 70 of the respective bearing blocks. The structure of the present suspension positions the grease fittings upwardly and away from contact with the ground. Further, the grease fittings 76 and 78 are closely spaced so that the grease supply lines are readily connected proximately together. This saves servicing time. Grease communicates through the fitting 76 and the grease passageway 74 to the bearing block 62. Similarly, grease communicates through the fitting 78 and flexible grease line 82 disposed within the box beam 60 to the opposing bearing block 63.

The foregoing specification describes the suspension for motor vehicles and consolidated positioning of the grease fittings to facilitate servicing the bearing blocks with grease. It is to be understood, however, that numerous changes and variations may be made in suspension structure within the spirit and scope of the present invention and that modifications and changes may be made therein without departing from the scope thereof as set forth in the appended claims.

What is claimed is:

1. A suspension for a rear or front portion of a vehicle, comprising:
   a pair of stabilizer assemblies for disposing longitudinally on opposing sides of a chassis of a vehicle and attaching to an axle thereof; and
   an anti-sway stabilizer for disposing in transverse relation proximate an end of the chassis and attaching to the axle;

each stabilizer assembly comprising a pair of stabilizer bars disposed in spaced-apart relation and the anti-sway stabilizer comprising a third stabilizer bar;

each of the stabilizer assemblies further comprising:
 a frame connector for welding to the chassis and pivotably connected to a respective end of the pair of stabilizer bars;
 an axle connector pivotably connected to a respective opposing end of the pair of stabilizer bars and having a first portion of a saddle that extends about the axle, the first portion defining a passageway for receiving a bolt therethrough for connecting the stabilizer bars to the axle; and
 a shock absorbing member for being attached at a first end to the axle connector and at an opposing end to the chassis;

the anti-sway stabilizer further comprising:
 a transverse connector pivotably connected to one end of the third stabilizer bar and having a second portion of the saddle, which second portion defines a passageway that aligns with the passageway in one of the first portions of the saddle for receiving the bolt therethrough for connecting the first and second portions of the saddle about the axle; and
 a bracket for being rigidly attached at a first end to the chassis and pivotably connected to an opposing end of the third stabilizer bar.

2. The suspension as recited in claim 1, wherein each of the stabilizer bars comprises an elongated member and a pair of bearing blocks attached at respective opposing ends of the elongated member, each bearing block defining an opening therethrough.

3. The suspension as recited in claim 2, wherein each of the bearing blocks defines a seat for roller bearings.

4. The suspension as recited in claim 2, wherein the frame connector comprises:
 a pair of opposing plates each defining two throughbores and receiving the bearing blocks at a respective first end of the stabilizer bars between the plates; and
 pins extending through the aligned openings in the plates and the respective bearing block.

5. The suspension as recited in claim 2, wherein the axle connector comprises:
 a pair of opposing plates each defining two throughbores and receiving the bearing block at a respective second end of the stabilizer bars between the plates; and
 pins extending through the aligned openings in the plates and the respective bearing block.

6. The suspension as recited in claim 1, wherein the first portion of the saddle comprises a pair of spaced-apart plates extending substantially perpendicularly laterally from the axle connector and the passageway comprises throughbores defined in the plates.

7. The suspension as recited in claim 6, further comprising a pair of spaced-apart lugs attached to one of the plates for connecting to the first end of the shock absorbing member.

8. The suspension as recited in claim 7, further comprising a shock tower rigidly attached to the chassis for connecting to the second end of the shock-absorbing member.

9. The suspension as recited in claim 2, wherein the transverse connector comprises:
 a pair of opposing support plates each defining a throughbore and receiving the bearing block at a first end of the third stabilizer bar between the support plates; and
 a pin extending through the aligned throughbores in the support plates and the bearing block.

10. The suspension as recited in claim 9, wherein the second portion of the saddle comprises a pair of spaced-apart second plates extending substantially perpendicularly laterally from the support plates, the second plates defining the passageways therein.

11. The suspension as recited in claim 2, wherein the bracket comprises:
 a pair of spaced-apart members each defining a throughbore a second end thereof; and
 a pin extending through the aligned throughbores in the members and the bearing block.

12. The suspension as recited in claim 2, wherein the bearing blocks each include a bearing race.

13. The suspension as recited in claim 12, wherein each of the bearing races holds a plurality of ball bearing members.

14. The suspension as recited in claim 2 wherein each of the stabilizer bars comprises a grease fitting for connecting to a grease supply line that communicates grease from a grease supply through the fitting into the bearing block for lubricating the bearing.

15. The suspension as recited in claim 14, wherein the grease fitting is disposed proximate the first bearing block.

16. The suspension as recited in claim 15, further comprising a grease line extending from the grease fitting through the elongated member to the opposing bearing block.

17. The suspension as recited in claim 16, wherein the grease line connects to a second grease fitting separate from a first grease fitting.

18. The suspension as recited in claim 17, wherein the first and second grease fittings connect to separate grease supply lines each connected to a manifold that receives grease from the grease supply.

19. The suspension as recited in claim 1, wherein the axle defines at least one channel for receiving therein the bolt extending through the aligned passageways in the first and second portions of the saddle.

20. The suspension as recited in claim 1, wherein the axle defines at least two opposing channels, one channel for receiving therein the bolt extending through the aligned passageways in the first and second portions of the saddle and the other channel receiving a lug projecting from the plate in a portion opposing the passageways.

21. A suspension for a rear or front portion of a vehicle, comprising:
 a pair of stabilizer assemblies each having two spaced-apart stabilizer bars for disposing in longitudinal relation on opposing sides of a chassis and a transverse stabilizer having one stabilizer bar for disposing in transverse relation to the chassis proximate an end of the chassis, each stabilizer bar having a bearing block at respective opposing ends thereof;
 the stabilizer assemblies each connecting to the chassis with a frame connector, an axle connector and a shock absorbing member,
 the frame connector for welding to the chassis and defining a pair of throughbores that receive a pin therethrough and through a respective one of the bearing blocks to attach the frame connector to the stabilizer bars;
 the axle connector having a first portion and a second portion including a pair of plates extending perpendicularly therefrom, the first portion defining a pair of throughbores each for receiving a pin that extends therethrough, and through a respective one of the other of the bearing blocks to attach the axle connector to the stabilizer bars, the pair of plates each defining a passageway for receiving a bolt therethrough which bolt secures the axle connector to a housing of an axle of a vehicle for connecting the stabilizer bars to the axle; and the shock-absorbing member for being attached at a first end to the axle connector and at an opposing end to the chassis; and the transverse stabilizer further including:

a transverse connector having a first portion that defines a throughbore for receiving a pin that extends therethrough and through one of the bearing blocks to attach the transverse connector to the stabilizer bar and a second portion extending from the first portion and defining a passageway that aligns with the passageway in the pair of plates in the second portion of the axle connector for receiving the bolt therethrough for connecting the transverse connector to the axle; and a bracket for being rigidly attached to the chassis at a first end and defining a throughbore proximate an opposing end that receives a pin therethrough and through the other of the bearing blocks for attaching the stabilizer bar to the chassis.

22. A suspension for a rear or front portion of a vehicle, comprising:

a pair of stabilizer assemblies for being disposed longitudinally on opposing sides of a chassis and a transverse stabilizer for disposing in transverse relation to the chassis proximate an end of the chassis;

each stabilizer assembly comprising:

two spaced-apart stabilizer bars pivotally mounted at respective ends to a frame connector and pivotally mounted at respective opposing ends to an axle connector, the frame connector for welding to the chassis and defining a pair of throughbores that each receive a pin therethrough and through a respective opening in an end portion of the stabilizer bar to attach the frame connector to the stabilizer bars; and the axle connector having a first portion and a saddle first portion, the first portion defining a pair of throughbores each for receiving a pin that extends therethrough and through a respective opening in an opposing end of the stabilizer bars to attach the axle connector to the stabilizer bars, the saddle first portion having a pair of opposing plates each defining a passageway for receiving a bolt therethrough for connecting the stabilizer bars to the axle; and a shock absorbing member for being attached at a first end to the axle connector and at an opposing end to the chassis;

the transverse stabilizer comprising:

a stabilizer bar;

a transverse connector having:

a first portion that defines a through bore for receiving a pin that extends therethrough and through an opening in an end of the stabilizer bar to pivotally attach the transverse connector to the stabilizer bar and a saddle second portion having opposing plates extending from the first portion and the plates each defining a passageway that aligns with the passageway in the plates of the saddle first portion for receiving the bolt therethrough for connecting the saddle second portion to the saddle first portion about the axle; and a bracket for being rigidly attached to the chassis at a first end and defining a throughbore proximate an opposing end that receives a pin therethrough and through an opening in an opposing end portion of the stabilizer bar for attaching the stabilizer bar to the chassis.

* * * * *